(12) United States Patent
Puttagunta et al.

(10) Patent No.: US 10,574,579 B2
(45) Date of Patent: Feb. 25, 2020

(54) END TO END QUALITY OF SERVICE IN STORAGE AREA NETWORKS

(71) Applicant: HEWLETT PACKARD ENTERPRISE DEVELOPMENT LP, Houston, TX (US)

(72) Inventors: Krishna B. Puttagunta, Roseville, CA (US); Rupin T. Mohan, Andover, MA (US); Vivek Agarwal, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2 days.

(21) Appl. No.: 15/518,722

(22) PCT Filed: Oct. 31, 2014

(86) PCT No.: PCT/US2014/063517
§ 371 (c)(1),
(2) Date: Apr. 12, 2017

(87) PCT Pub. No.: WO2016/069009
PCT Pub. Date: May 6, 2016

(65) Prior Publication Data
US 2017/0237670 A1    Aug. 17, 2017

(51) Int. Cl.
*H04L 12/851* (2013.01)
*H04L 29/08* (2006.01)
*H04L 12/18* (2006.01)

(52) U.S. Cl.
CPC .............. *H04L 47/24* (2013.01); *H04L 12/18* (2013.01); *H04L 47/2433* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 7,602,723 | B2 | 10/2009 | Mandato et al. |
| 7,653,735 | B2 | 1/2010 | Mandato et al. |
| 7,668,177 | B1 | 2/2010 | Trapp et al. |
| 7,843,907 | B1 | 11/2010 | Abou-Emara et al. |

(Continued)

OTHER PUBLICATIONS

Brocade Communications Systems, Inc., "Simplifying Virtualization Through Adaptive Networking Technology," (Research Paper), White Paper, 2008, 7 pages.

(Continued)

*Primary Examiner* — Candal Elpenord
(74) *Attorney, Agent, or Firm* — Hewlett Packard Enterprise Patent Department

(57) ABSTRACT

Example implementations relate to end-to-end quality of service in storage area networks. For example, a method includes receiving input at a target from a user, the input to assign a priority level to a logical unit. This may include registering the logical unit priority level at a switch using an in-band communication in response to the priority level being assigned to the logical unit. This can also include instructing a host to implement the priority level using the in-band communication in response to the priority level being assigned to the logical unit. Further, the methods and systems may enforce the priority level with the host, the switch, and the target.

20 Claims, 7 Drawing Sheets

(56) References Cited

U.S. PATENT DOCUMENTS

| | | | |
|---|---|---|---|
| 8,090,908 B1* | 1/2012 | Bolen | H04L 69/18 |
| | | | 711/111 |
| 8,160,072 B1 | 4/2012 | Gnanasekaran et al. | |
| 8,244,930 B1 | 8/2012 | Dykema et al. | |
| 8,438,138 B2 | 5/2013 | Rathi et al. | |
| 8,528,041 B1 | 9/2013 | Haney et al. | |
| 9,614,910 B2* | 4/2017 | Hathorn | H04L 67/1097 |
| 2002/0181395 A1 | 12/2002 | Foster et al. | |
| 2005/0089054 A1 | 4/2005 | Ciancaglini et al. | |
| 2006/0047907 A1* | 3/2006 | Shiga | G06F 3/0605 |
| | | | 711/114 |
| 2007/0028001 A1 | 2/2007 | Phillips et al. | |
| 2007/0168470 A1* | 7/2007 | Nonaka | H04L 29/12009 |
| | | | 709/219 |
| 2008/0162735 A1 | 7/2008 | Voigt et al. | |
| 2009/0207866 A1 | 8/2009 | Cholas et al. | |
| 2010/0014540 A1 | 1/2010 | Brocke et al. | |
| 2011/0213872 A1 | 9/2011 | Santiago et al. | |
| 2011/0302287 A1 | 12/2011 | Muppirala et al. | |
| 2014/0204957 A1 | 7/2014 | Kanda et al. | |
| 2015/0049604 A1* | 2/2015 | Keith | H04L 47/2441 |
| | | | 370/230 |
| 2017/0034008 A1 | 2/2017 | Puttagunta et al. | |

OTHER PUBLICATIONS

EMC Corporation, "EMC Navisphere Quality of Service Manager (NQM)," Sep. 2006, (Research Paper), Data Sheet, 4 pages, available at http://www.emc.com/collateral/software/data-sheet/c1152-emc-navisphere-quality-service-manager.pdf.

Gulati, A. et al., "Efficient and Adaptive Proportional Share I/O Scheduling," (Research Paper), HP Labs Technical Report, HPL-2007-186, Nov. 20, 2007, 13 pages.

Hewlett-Packard Development Company, L.P., "HP Process Resource Manager Overview," (Research Paper), Rev. 4, Jun. 2007, 21 pages.

Hewlett-Packard Development Company, L.P., "Introducing HP Integrity Virtual Machines," (Research Paper), A white paper from HP, Sep. 8, 2005, 12 pages.

International Search Report & Written Opinion received in PCT Application No. PCT/US2014/063517, dated Jul. 16, 2015, 12 pages.

Microsoft Corporation, "I/O Prioritization in Windows Vista," (Research Paper), May 10, 2006, 12 pages, available at http://www.microsoft.com/whdc/driver/priorityio.mspx.

Nagar, S. et al., "Class-based Prioritized Resource Control in Linux," (Research Paper), 2003, 19 pages, available at http://ckrm.sourceforge.net/downloads/ckrm-ols03-paper.pdf.

Nagar, S. et al., "Improving Linux Resource Control Using CKRM," (Research Paper), Proceedings of the Linux Symposium, vol. 2, 2004, 16 pages.

VMware, Inc., "Virtualizing SAN Connectivity with VMware Infrastructure 3 and Brocade Data Center Fabric Services," (Research Paper), White Paper, Aug. 11, 2008, 15 pages, available at http://www.vmware.com/files/pdf/VMware-BRCD_Virtualizing_SAN_Connectivity_GA-TB-084-00.pdf.

Yezhkova, N. et al., "Worldwide Disk Storage Systems 2008-2012 Forecast: Content-Centric Customers—Reshaping Market Demand," (Research Paper), IDC, May 2008, 54 pages.

* cited by examiner

100

300

END TO END QUALITY OF SERVICE IN STORAGE AREA NETWORKS

BACKGROUND

A Storage Area Network (SAN) provides connectivity and access to a set of devices like storage arrays, hosts, and the switches in between. Fibre Channel (FC) is a dominant protocol that enjoys significant market share within these SAN deployments. Also, these FC components come with a wide variety of features that enhance the availability, performance and security of SANs. Quality of service (QoS) is one such feature that ensures desired performance from SAN components.

BRIEF DESCRIPTION OF THE DRAWINGS

Certain examples are described in the following detailed description and in reference to the drawings, in which.

DETAILED DESCRIPTION OF SPECIFIC EXAMPLES

Although several point solutions exist today to support quality of service (QoS) at each component level, there are really no known solutions that enforce automatically uniform end to end QoS across all three major components in the SAN, namely the host, switch and target array. Additionally, there is not really any solution that provides end to end QoS employing the same level of quality assurance at each component in the path from host to a logical unit in the array. Further, in present solutions, substantial manual configuration is required at each component level.

The present disclosure relates generally to a method of ensuring end to end QoS requirements are enforced uniformly on each major component in a path traversed by data including a host, a target, and a switch. The granularity of the QoS is at the level of a logical unit from a target point of view and can also be at the frame level when the actual frames are traversing in the network back and forth. The logical unit is also referred to as a logical unit number (LUN) and these terms are herein used interchangeably.

In order to achieve end to end QoS, a special in-band communication mechanism is used to pass LUN level requirements from a target array, or target, to a connected switch and connected host so that all three, the target, switch, and host can work in unison while implementing end to end QoS. This same technique can be extended to other storage networking protocols like converged networks supporting both 'Fibre Channel over Ethernet (FCoE)' and 'Internet Small Computer System Interface (iSCSI)'. In the case of converged Ethernet fabrics, a special in-band multicast communication mechanism will be used for exchanging information, such as metadata, between storage area network (SAN) components.

Several advantages of the present techniques include automatic policy enforcement end to end, which adds higher efficiency and the elimination of human error in configuring priorities at each component. The policy remains uniform by each component in a SAN matching the requirement and priority levels indicated by the target device.

Figure 1:
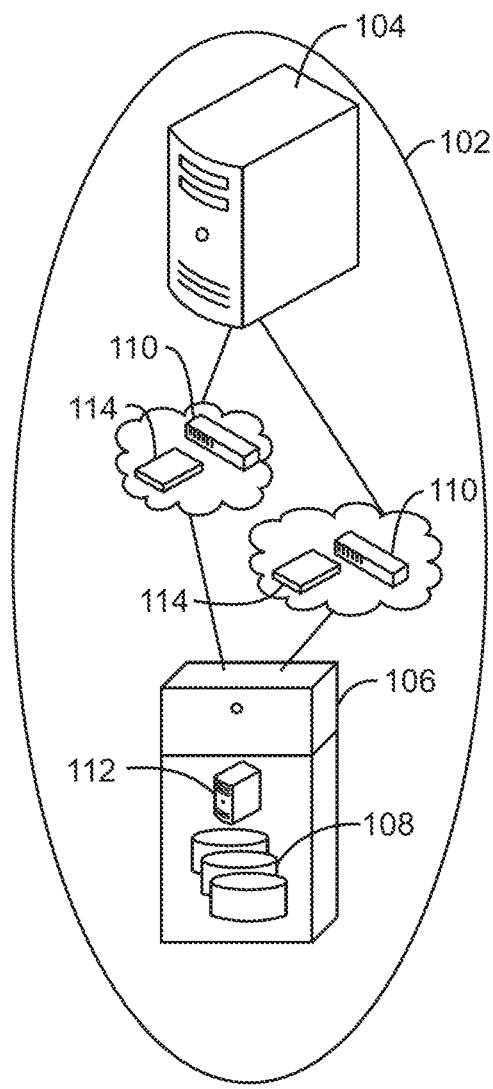
FIG. 1 is a diagram of a storage area network in accordance with examples of enforcing priority levels across multiple components with in-band communication protocols as disclosed herein.

FIG. 1 is a diagram of a storage area network 100 in accordance with examples of enforcing priority levels across multiple components with in-band communication protocols as disclosed herein. As shown in FIG. 1, the server network 100 may include a storage area network (SAN) 102, which may be geographically dispersed although here is shown as contained in a single site. The SAN 102 may include a number of servers 104 operatively coupled by a communications network, for example, a wide area network (WAN), local area network (LAN), virtual private network (VPN), the Internet, and the like. The SAN 102 may also include a target data storage system 106 that includes storage devices 108, such as an array of physical storage disks.

In order to achieve end to end QoS, in-band communication is used to pass LUN level requirements from a target, to a connected switch and connected host so that all three, the target, switch, and host can work in unison while implementing end to end QoS. One example of this is accomplished by allowing the servers 104 to access target data storage systems 106 within the SAN 102, which may include a plurality switches 110 coupled by data links, for example, Ethernet interface connections, Fibre Channel (FC) interfaces, FCoE interfaces, and iSCSI interfaces. The data links may allow switches to communicate without passing through an external communications network but instead communicate directly from one switch 110 to another switch 110 within a fabric of interconnected switches. SAN 102 systems enable the possibility of storing multiple copies or "replicas" of data at various physical locations throughout the system. In the SAN 102, the storage controllers at various sites communicate with each other using a common data transfer protocol to coordinate storage and management activities at various sites. The data transfer protocol is key to maintain performance as well as proper ordering in a multi-volume, multi-target environment. End to end QoS techniques are implemented for systems that use FC, FCoE, iSCSI, or other similar protocols as the data transfer protocol across the server network 100.

The target data storage systems 106 may be connected through replication links for storage-based replication of the virtual machine data. In one example, replication links are also part of the SAN 102. Data stored to the target data storage systems 106 may be replicated between the target data storage systems 106 different SAN sites through replication links using synchronous or asynchronous replication.

The target data storage systems 106 can include a target priority level module 112. The target priority level module 112 is configured to receive input from a user to indicate a priority level or tier system for each of the components. Although in FIG. 1, the target priority level module 112 is shown as a physical module, the present disclosure is not so limited and may for any physical module of memory shown also exist in software form. The target priority level module also is configured to send a priority level communication to a switch 110. The sending of the priority level can be in response to an initiator of the server 104 or other device on the server network 100 attempting to communicate with a storage device 108 of the target data storage system 106. An initiator in the server 104 uses code to send commands over in-band SAN links.

The switch 110 can include a switch priority module 114. The switch priority module 114 may be used to configure and enforce the priority level or tier system that is being implemented at the data storage system 106 local to each switch 110. A switch priority module 114 can allow the switching infrastructure, for example, to automatically enforce priority routing at the frame level so that frames are forwarded to the destination address using the priority level pre-configured. Hence a uniform priority level can be enforced from end to end over the server network 100.

The configuration of the server network 100 is not limited to that shown in FIG. 1, but may include any number of other implementations of the techniques described herein. For example, a server network 100 may include any suitable number of data centers 102 and each data center 102 may include any suitable number of physical servers 104 and any suitable number of target data storage systems 106. Further, each server 104 may include one or more virtual machines (not shown), each of which may be migrated to any other suitable server 108. For example, a virtual machine hosted by the server 104 of site B 106 may be migrated to the server 104 of site A 104.

Figure 2:
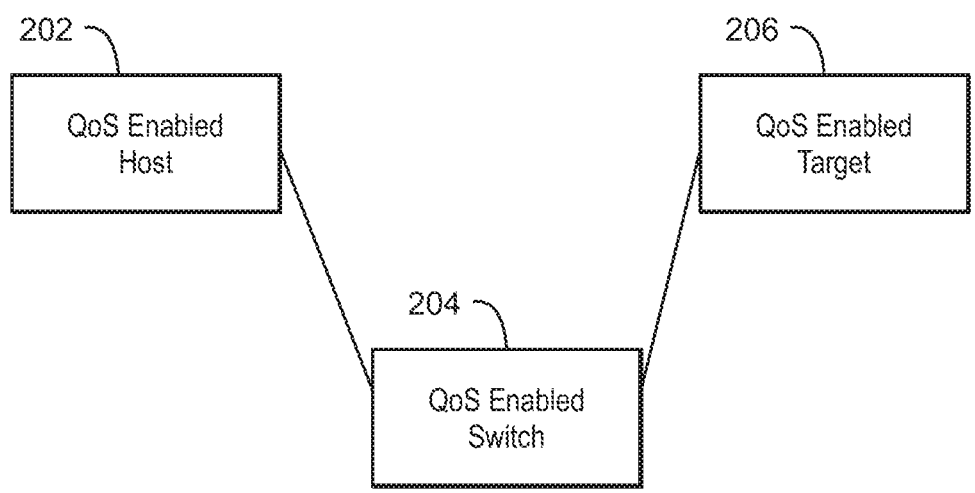
FIG. 2 is an simplified diagram of components in a storage area network (SAN) to implement end to end Quality of Service (QoS) with in-band communication protocols.

FIG. 2 is a simplified diagram of components in a storage area network 200 (SAN) to implement end to end Quality of Service (QoS) with in-band communication protocols. A QoS enabled Host 202 is an initiator that may implement a number of actions to enforce and maintain end to end QoS. The QoS enabled host 202 can send a request to a QoS enabled switch 204 and learn the attributes of LUNs connected to each port for a QoS enabled target 206. These attribute may include the priority levels indicated by the QoS enabled target 206 and may also include other limitations or requirements for a specific logical unit that may be needed to maintain end to end QoS.

Through in-band communication, each component, including the QoS enabled host 202, QoS enabled switch 204, and QoS enabled target 206, can maintain uniformity in QoS by discovering priority levels from each other as well as through information attached to delivered frames. The QoS enabled host 202 parses a received QoS profile and determines if an action is necessary. For example, if QoS is enabled for a particular LUN, the QoS enabled host 202 can identify the LUN priority when used for addressing requests. Additionally, the QoS enabled host 202 can specify priority for outgoing frames in the header of a frame. In a Fibre Channel protocol, the priority may be specified in the FC header or may be specified in a class specific control (CS_CTL) priority field. An example of this functionality can be seen in Fibre Channel Framing and Signaling version 3 (FC-FS-3) or any later version. In one example, the CS_CTL priority field enable bit, labeled in some instances as the Frame Control (F_CTL) bit, will be set to one to indicate that priority functionality is enabled. The QoS enabled host 202 can use the priority code for each frame addressed to a logical unit based on the priority the QoS enabled host 202 has stored for that particular logical unit.

The QoS enabled switch 204 may also take actions to implement end to end QoS. For example, the QoS enabled switch 204 may look for a CS_CTL/Priority Enable bit, such as the F_CTL bit, or bit 17 in the FC Header. Once identified, the QoS enabled switch 204 may then process frame routing based on the identified CS_CTL priority levels. In protocols outside of Fibre Channel, the QoS enabled switch 204 could similarly route frames based on detected priority levels.

The QoS enabled target 206 may also take actions to implement end to end QoS. The QoS enabled target 206 maintains the same CS_CTL/Priority based information when returning frames to the QoS enabled host 202 within the same exchange. While these techniques discuss methods and actions for Fibre Channel protocol, it should be understood that similar techniques could be applied by hosts, switches, and targets for any in-band communication protocol capable of transmitting priority level information. In some examples, other parameters could be used instead of priority level information such as bandwidth, or input/output operations per second (IOPS). Each of these parameters could be used to indicate QoS requirements.

In one example, when a user adds, updates, or alters a priority level of a LUN at a QoS enabled target 206, this information is first registered to a QoS enabled switch 204. Upon registration of a logical unit's priority levels at the QoS enabled switch 204 can trigger a change notification to all hosts within that zone. In the context of SANs, the hosts in a zone can include not only the QoS enabled host 202, but may also include other hosts connected to the SAN.

In one example, if a QoS enabled host 202 receives a change notification, the host performs a query to a switch name server database to get additional information and requirements as specified by the priorities of the logical unit. The switch name server database may provide a variety of sources for common configuration databases and name resolution mechanisms. Having learned about LUN QoS priorities from this query, in this example, the QoS enabled host 202 should take action to implement exactly the same LUN priorities for a particular LUN on the host side. One example of implementing QoS matching LUN priority levels includes implementing QoS at a frame level based on T11 FC-FS-x (Fibre Channel Framing and Signaling) standards. In this example, the QoS enabled host 202 specifies priority for outgoing frames in the FC Header, CS_CTL/Priority field to align with designated Tiers as indicated by the QoS enabled target and listed in Table 1 below. The result includes matching frame priority to the priority level the QoS enabled host 202 learned from the LUN attributes retrieved from the switch name server database. In this way the requirements of the logical unit specified by the target, such as the number of tiers or priority levels, are passed on and matched to the host and switch.

Figure 3A:
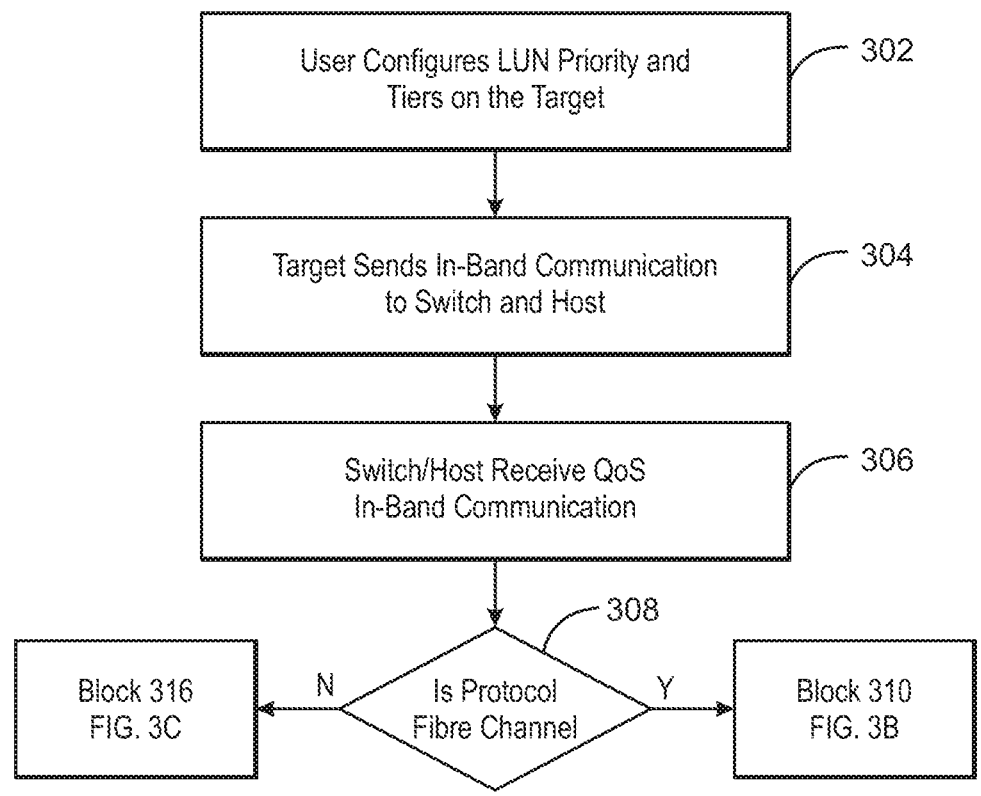
FIG. 3 is a block diagram of an example method for implementing end to end QoS in a storage area network.

FIG. 3A is a block diagram of an example method 300 for implementing end to end QoS in a storage area network. The method 300 starts at block 302 in FIG. 3A, with a user configuring a logical unit, often referred to as a logical unit number (LUN), to have a certain priority level and also the tiers of possible priority. For an example of these priority levels see the tiers indicated in Table 1 below. These priority levels may be limited to three tiers, however additional tiers may be included for increased granularity.

Figure 3B:
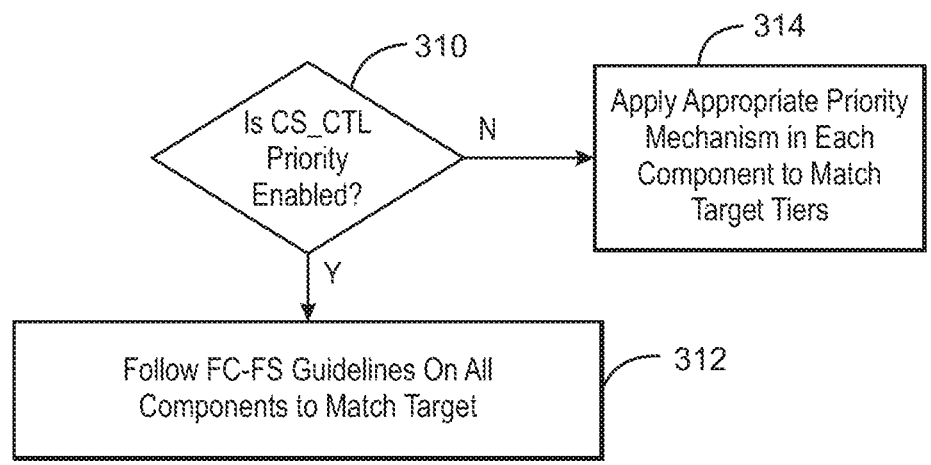

Once the configuration of priority is done on the target side, at block 304 the target device sends its logical unit QoS priority levels to the switch and host using in-band communications. At block 306, a switch or host must receive QoS from an in-band communication to proceed. Once received, a determination is made if the protocol of the in-band communication is Fibre Channel protocol or another protocol 308. If yes, the protocol is Fibre Channel, it is determined if standard of priority control for Fibre Channel is enabled in block 310 in FIG. 3B.

In one example, the standard means for priority control is class specific control (CS_CTL). While CS_CTL/Priority is one specific means of priority control in the Fibre Control protocol, other means for priority control are also contemplated. A determination is made if this means for priority control is enabled 310. If yes, the priority control mechanism for Fibre Channel is enabled, then each component that has received the in-band communication will follow Fibre Channel specification (FC-FS) guidelines to match the priority levels to the levels indicated by the target 312. However, if CS_CTL is determined as not enabled, the components will instead apply a different priority mechanism based on the protocols each component is implementing in order to match their priority levels or tiers to the levels indicated by the target 314.

Figure 3C:
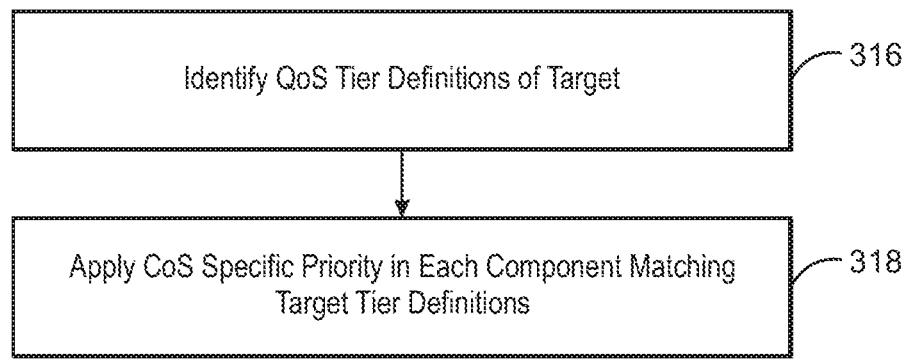

However if, at block 310, it is determined that the protocol being implemented by a component is not Fibre Channel protocol, the QoS tier definitions are identified in block 316 in FIG. 3C. In one example, there may be three tiers of service, and the tiers may be designated by classes of service (CoS). At block 318, the listed priorities are applied in each component to match the tier definitions indicated by the target. In one example these listed priorities are CoS as indicated in Table 2 below.

In this example, the in-band communication can be a Fibre Channel protocol and may use FC-CT commands, however other in-band communication protocols and priority mechanisms are also possible. In a Fibre Channel protocol, each switch should implement the appropriate QoS mechanism to assign priority based on the CS_CTL field while frames are being traversed through the switch or network. Similarly, the end target such as a storage array, should also maintain the same CS_CTL based in formation while sending frames back to the host within the same exchange.

An example of the three priority levels that may be implemented in each component is seen in Table 1 with corresponding tiers. It should be noted that in Fibre Channel protocol each of these priorities may be indicated in the CS_CTL/Priority frame header, for example with bits 31-25.

TABLE 1

Priority Values and Tiers

| Tier | Priority |
| --- | --- |
| TIER 1 | High Priority |
| TIER 2 | Medium Priority |
| TIER 3 | Low Priority |

Once all three devices in a frame path, viz., host, switch, and target, honor the priority levels and implement necessary logic in their respective hardware to handle these frames accordingly, end to end QoS can be implemented automatically without any user intervention. As mentioned before, CS_CTL based frame priority is one mechanism, but the key idea here is that all three components in the network should implement appropriate priority mechanism matching the LUN requirements as specified by the target array.

Figure 4:
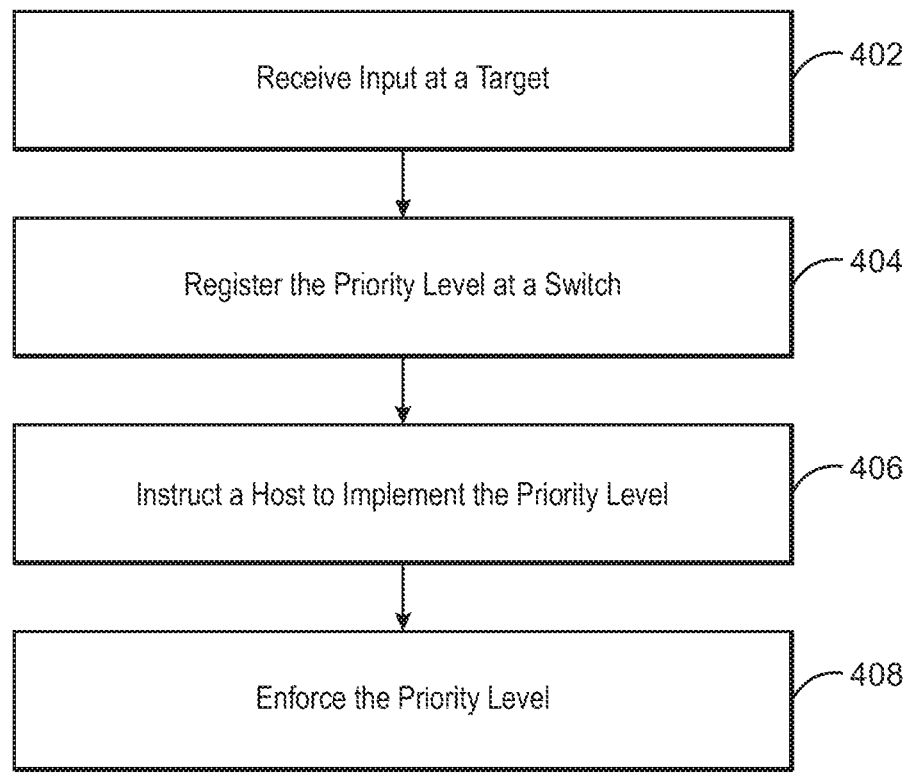
FIG. 4 is another block diagram of an example method for implementing end to end QoS in a storage area network.

FIG. 4 is a simplified block diagram showing a method for implementing end to end QoS in a storage area network. At block 402, input is received at a target. The target may be data storage device, server, or a network of storage nodes made up of general purpose computers, or any other storage device. At block 404, the priority level is registered at a switch. The priority level may be determined by the input received at block 402, and can be used by the switch to later ensure proper routing of frames based on an attached priority level. At block 406, a host may be instructed to implement the priority level. The priority level may be determined by the input received at block 402, and can be used by the host to later ensure proper handling of frames based on an attached priority level. At block 408, the priority level is enforced across all three components, e.g. the host, the target, and the switch.

Figure 5:
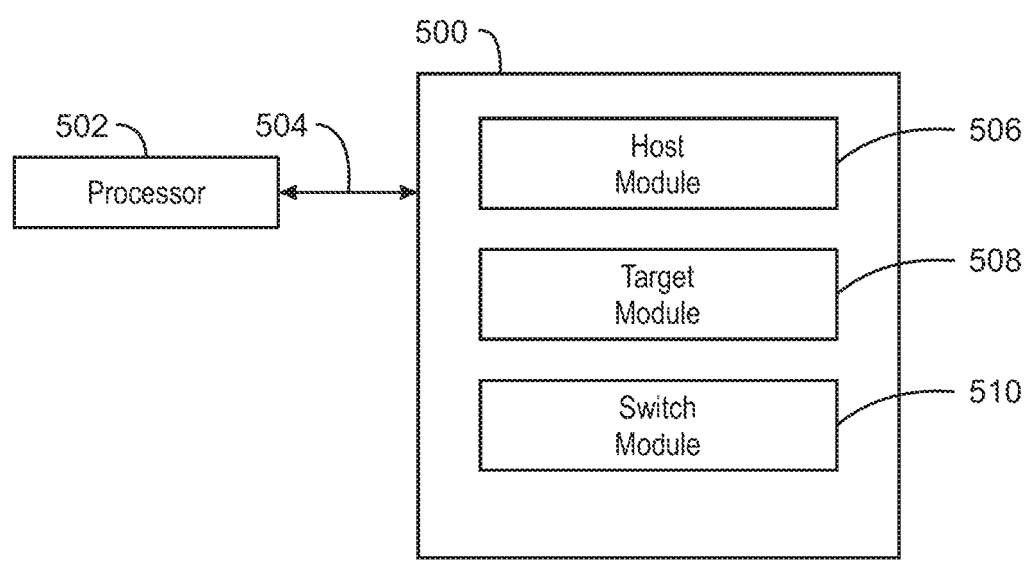
FIG. 5 is a diagram of a non-transitory, computer-readable media that holds code that enables automatic end to end QoS in all components of a SAN.

FIG. 5 is a diagram of a non-transitory, computer-readable media that holds code that enables automatic end to end QoS in all components of a SAN. The computer-readable media 500 can be accessed by a processor 502 over a system bus 504. In some examples, the code may direct the processor 502 to perform the steps of the current method as described with respect to FIGS. 2, 3, and 4.

The computer-readable media 500 can include a host module 506. A computer system and computer-readable medium 500 may be part of an Ethernet fabric. For Ethernet fabrics multicast based in-band communication protocols may be used to exchange information between all SAN components. Further, the host module 506 may conceptually be considered a component of a SAN, wherein a host can join the SAN. The host module 506 can be configured to send multicast protocol announcements. In some examples, the multicast announcements can be sent from both the host module 506, and a target module 508 to a switch module 510.

When broadcasting in a multicast based communication format, standard multicast frames may be exchanged between a switch module and end devices. These communications are in pass—band information, pass commands, and get a response. To enable this, all devices in a given SAN first join a well-defined multicast group. Communication is then passed among each device using the address for that multicast group. The exchange of information is enabled between devices by this multicast technique as well as the ability to control or configure a fabric to ensure end to end QoS. For example, the priority level for a specific logical unit, or LUN, is first passed to the switch and then to the host. The host and switch may then implement a suitable mechanism to match the requirements of the logical unit. Although Fibre Channel mechanisms were discussed above, another such mechanism is to implement 802.1p class of service (CoS) priority levels as shown below in Table 2.

TABLE 2

Defining Traffic Behavior for CoS Priorities

| Class of Service Priority | Tier Priority |
| --- | --- |
| CoS 6 Priority 6 | TIER 1 |
| CoS 5 Priority 5 | TIER 2 |
| CoS 4 Priority 4 | TIER 3 |

In this example, the same priority levels will be assigned at each component level, so that end to end QoS is automatically implemented when actual frames start traversing host module 506 to switch module 510 to target module 508 and vice versa.

The block diagram of FIG. 5 is not intended to indicate that the computer-readable media 500 is to include all of the components or modules shown in FIG. 5. Further, any number of additional components may be included within the computer-readable media 500, depending on the details of the end to end QoS technique and in-band communication described herein.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method, comprising:
receiving, by a switch from a target, an assignment of a priority level to a logical unit of the target;
registering, by the switch, the priority level for the logical unit in response to the priority level being assigned to the logical unit;
instructing, by the switch, a host to implement the priority level in response to the priority level being assigned to the logical unit;
receiving, by the switch, data to be routed to or from the logical unit;
identifying, by the switch, a priority level for the data to be routed based on the registered priority level for the logical unit; and
routing, by the switch, the data to or from the logical unit based on the identified priority level for the data to be routed.

2. The method of claim 1, the method further comprising attaching the priority level to a frame of the data to be routed.

3. The method of claim 1, the method further comprising:
receiving, by the switch, the assignment via a multicast in-band communication broadcasted to a multicast group that includes the switch and the target.

4. The method of claim 1, the method further comprising matching a priority mechanism at both the host and the switch to a requirement of the logical unit specified by the target.

5. The method of claim 1, the method further comprising:
sending, by the switch, a change notification to the host based on the registration of the priority level at the switch.

6. The method of claim 5, the method further comprising:
querying, by the host, a switch name server database responsive to the change notification; and
accessing, by the host, priority level information for the logical unit based on the querying.

7. The method of claim 1, the method further comprising:
attaching, by the host, the priority level to a frame addressed to the logical unit.

8. A system, comprising:
a processor;
a computer readable medium comprising instructions when executed by the processor cause the processor to:
receive, from at least one of a target and a switch via an in-band communication, an instruction to implement a priority level of a logical unit of the target;
determine that a request is to be transmitted to the logical unit;
identify the priority level of the logical unit based on the received instruction to implement the priority level of the logical unit; and
transmit the request based on the identified priority level.

9. The system of claim 8, wherein to transmit the request, the instructions when executed by the processor further cause the processor to:
specify the priority level in a frame addressed to the logical unit.

10. The system of claim 8, wherein the instructions when executed by the processor further cause the processor to:
identify a multicast group relating to a storage area network to which the system belongs;
transmit, via a multicast in-band communication, an announcement relating to the priority level of the logical unit to the multicast group.

11. The system of claim 8, wherein the instructions when executed by the processor further cause the processor to:
query a switch name server database responsive to the instruction to implement the priority level for the logical unit;
access a requirement of the logical unit based on the query; and
implement a priority mechanism that enforces the requirement of the logical unit.

12. The system of claim 9, further comprising the switch, wherein the switch is configured to receive the frame from the host and route the frame to the target based on the specified priority level.

13. A non-transitory computer readable storage medium having program instructions, that when executed by a processor:
receive an input to assign a priority level to a logical unit of a target;
transmit, to a switch, the priority level of the logical unit for registration at the switch via an in-band communication in response to the input;
receive a request addressed to the logical unit, the request specifying the priority level as registered at the switch for the logical unit and relating to data stored at the logical unit; and
access a response to the request; and
transmit the response based on the priority level of the logical unit.

14. The computer readable storage medium of claim 13, wherein the instructions when executed by the processor further cause the processor to:
attach the priority level to a frame addressed to the host; and
transmit the frame to the switch to be transmitted to the host.

15. The computer readable storage medium of claim 13, wherein to transmit the priority level, the instructions when executed by the processor further cause the processor to transmit the priority via a multicast in-band communication to a multicast group that includes the switch.

16. The method of claim 1, further comprising:
receiving, by the target, the assignment of the priority level for the logical unit;
transmitting, by the target to the switch, the assignment;
determining, by the host, that a request is to be transmitted to the logical unit;
identifying, by the host, the priority level of the logical unit based on the instruction to implement the priority level of the logical unit; and
transmitting, by the host, the request based on the identified priority level.

17. The method of claim 1, the method further comprising:
receiving, by the switch, second data from the host to be routed to a second logical unit;
accessing, by the switch, a data frame header of the second data;
identifying, by the switch, a second priority level from the data frame header; and
routing, by the switch, the second data based on the second priority level.

18. The method of claim 1, further comprising:
joining, by the switch, a multicast group of a storage area network, wherein the assignment of the priority level is received via a multicast announcement that is broadcast to the multicast group.

19. The method of claim 1, further comprising:
determining, by the switch, that the priority level of the logical unit is implemented via a first protocol that is different than a second protocol implemented by the switch; and
identifying, by the switch, a matching priority level of the second protocol, wherein the data to or from the logical unit is routed based on the matching priority level.

20. The method of claim 19, wherein the first protocol or the second protocol comprises a Fibre Channel protocol.

* * * * *